United States Patent [19]
Sasaki et al.

[11] Patent Number: 4,820,464
[45] Date of Patent: Apr. 11, 1989

[54] METHOD FOR CONTROLLING INJECTION MOLDING MACHINE

[75] Inventors: Yoshinari Sasaki; Etsuji Oda; Hirozumi Nagata; Naoki Kurita; Hiroyuki Maehara, all of Numazu, Japan

[73] Assignee: Toshiba Kikai Kabushiki Kaisha, Tokyo, Japan

[21] Appl. No.: 753,623

[22] Filed: Jul. 9, 1985

[30] Foreign Application Priority Data

Jul. 19, 1984 [JP] Japan ................. 59-150371
Jul. 19, 1984 [JP] Japan ................. 59-150372

[51] Int. Cl.⁴ .............. B29C 45/04; B29C 45/08; B29C 45/28
[52] U.S. Cl. ................. 264/40.1; 264/40.5; 264/328.11; 425/149; 425/150; 425/451; 425/451.2
[58] Field of Search .......... 264/40.1, 40.6, 40.5, 264/328.15, 328.11, 328.8, 328.9; 425/150, 149, 145, 450.1, 451, 451.2

[56] References Cited

U.S. PATENT DOCUMENTS

| | | | |
|---|---|---|---|
| 3,647,309 | 3/1972 | Thompson | 425/150 X |
| 4,131,596 | 12/1978 | Allen | 264/40.5 |
| 4,150,080 | 4/1979 | Hagen | 264/536 X |
| 4,208,176 | 6/1980 | Salerno | 425/149 X |
| 4,505,659 | 3/1985 | Chijiishi et al. | 425/150 X |
| 4,579,515 | 4/1986 | Kawaguchi | 425/136 |
| 4,592,712 | 6/1986 | Gutjahr | 264/40.3 |
| 4,592,713 | 6/1986 | Gutjahr | 425/150 |
| 4,592,714 | 6/1986 | Gutjahr | 425/150 |
| 4,594,065 | 6/1986 | Langlois | 264/40.5 |
| 4,599,063 | 7/1986 | Gutjahr | 264/40.5 |
| 4,605,367 | 8/1986 | Gutjahr | 264/40.5 |
| 4,632,652 | 12/1986 | Farrell | 264/40.5 |

Primary Examiner—Jan H. Silbaugh
Assistant Examiner—Jeremiah F. Durkin, II
Attorney, Agent, or Firm—Koda and Androlia

[57] ABSTRACT

In a nozzle pressing and contacting process, a mold clamping process, and an injection process in an injection molding operation, a movable side, such as constituting a nozzle portion or screw of an injection apparatus, or a movable mold of a molding apparatus, is moved towards and contacted with a stationary side, such as constituting a mold or molding machine, or a stationary mold under a speed controlled condition. When the movable side approaches the stationary side, the pressure acting on the stationary side is measured and when the measured pressure reaches a predetermined set pressure, the speed control is switched to a pressure control to accurately and smoothly bring the movable side into contact with the stationary side.

7 Claims, 10 Drawing Sheets

FIG. 17
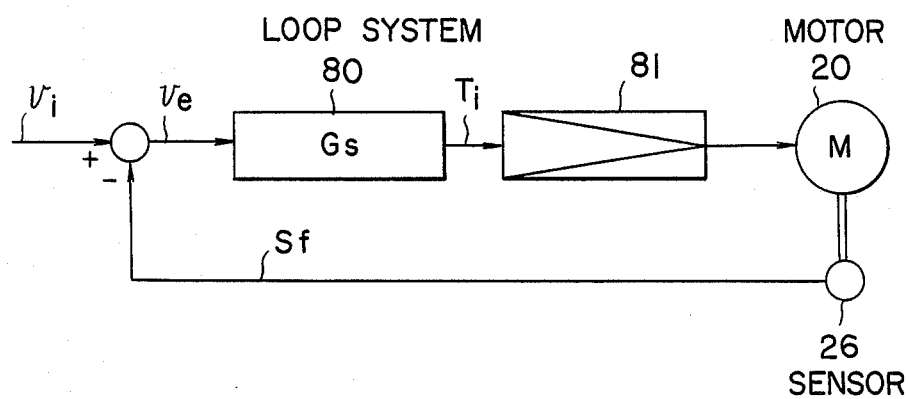
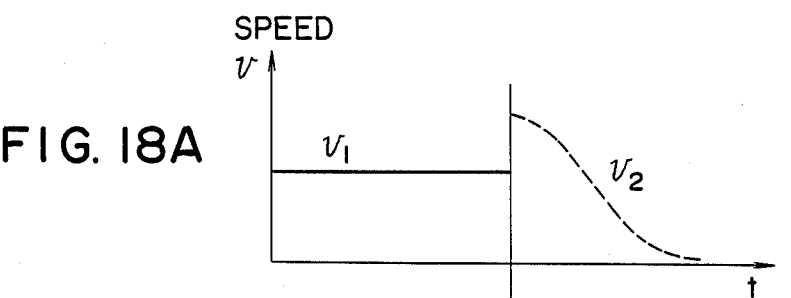
FIG. 18A
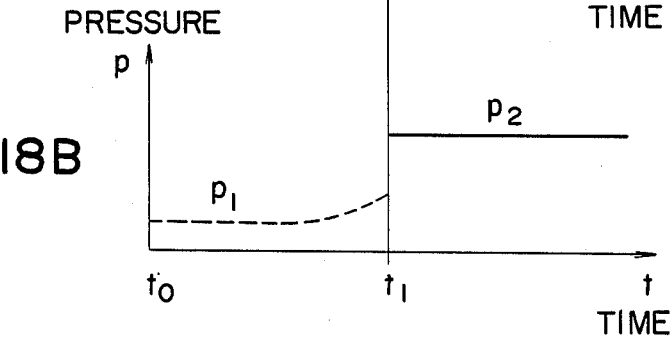
FIG. 18B

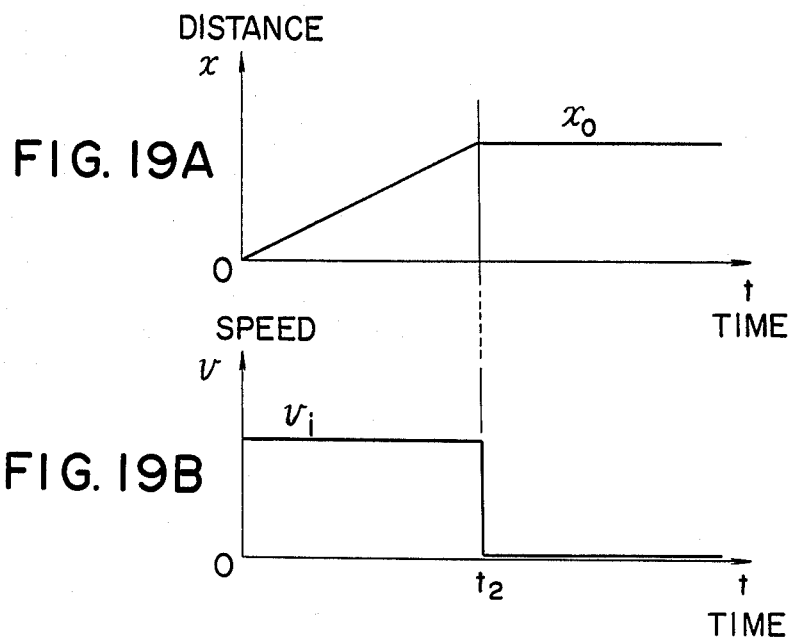
FIG. 19A
FIG. 19B
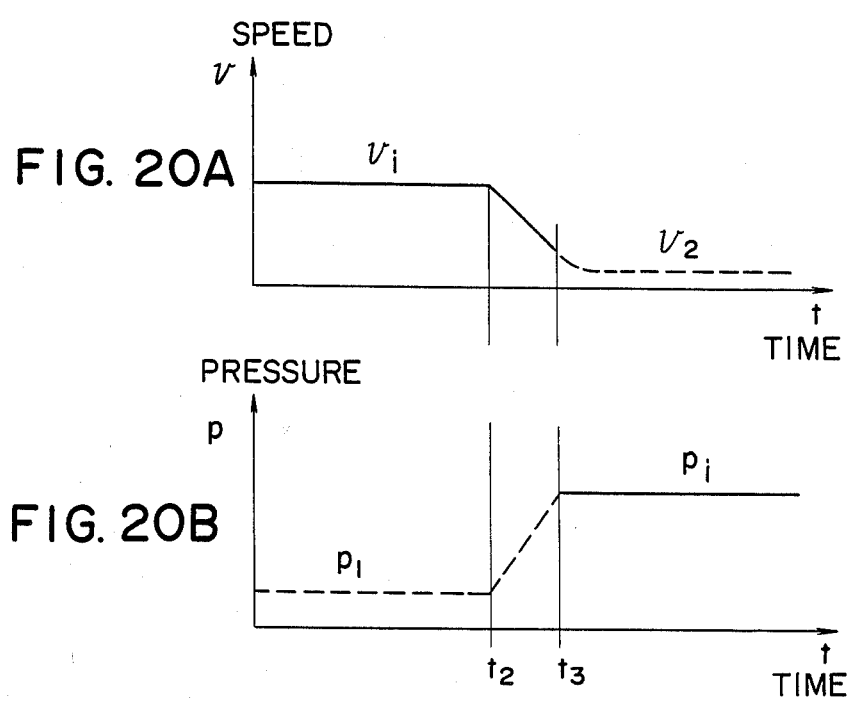
FIG. 20A
FIG. 20B

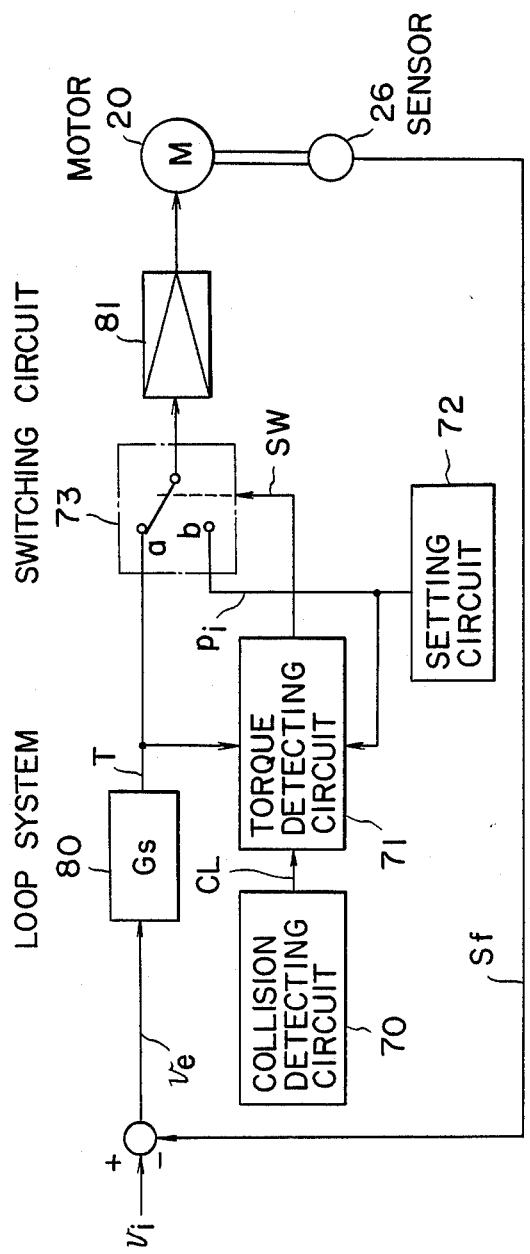
F I G. 21

METHOD FOR CONTROLLING INJECTION MOLDING MACHINE

BACKGROUND OF THE INVENTION

This invention relates to a method for controlling an injection molding machine for smoothly and accurately bringing an injection nozzle of an injection apparatus into contact with an opening of a mold of a molding apparatus through which material resin is injected to obtain mold products.

In designing an injection molding machine particularly by taking into consideration the automatic operations or controls of the various steps, attentions should be paid to the improvement of quality of products, the energy-saving and the improvement of productivity, and these attentions should be paid particularly to the material resin measuring process. Regarding a point of the improvement of the quality of the products, since the quality is mainly affected by the injection speed, pressure, resin temperature, injection amount and the like, it is required to measure a precise amount of the resin to be injected with high precision. Regarding a point of the energy-saving, the material resin in particle form fed into a heating cylinder of an injection molding machine is heated, sheared and kneaded therein by a screw to obtain an evenly molten resin and the energy required for the resin measuring stroke is minimized by effectively controlling the operation of the screw in conformity with the rate of revolution (called revolution number hereinafter), the back pressure of the screw, the kind or type of the resin and the temperature of the resin to be melted. Moreover, the productivity of the mold products can be achieved by minimizing the time interval required for the measuring process.

Generally, in an injection molding machine, material resin is fed into a heating cylinder through a hopper and the resin fed into the heating cylinder is fed forwardly by rotating a screw. During this operation, the resin is heated by a heater such as heating coil located on the outer periphery of the heating cylinder and then sheared and kneaded by rotating the screw. When the resin fed into a space formed at the front end portion of the heating cylinder is injected into a mold through a nozzle formed at the front end of the heating cylinder, the screw is then slightly retracted by the pressure of the resin injected into the mold, thereby preventing the molten resin from flowing outwardly. At this time, a back pressure is applied to the screw by a drive mechanism operatively connected to the screw, thereby preventing the introduction of air into the heating cylinder through the nozzle and the hopper, and measuring the resin amount precisely. Accordingly, the screw is gradually retracted by the pressure difference between the resin pressure and the back pressure applied by the drive mechanism. The revolution number and the back pressure of the screw are preset experientially by the kind and temperature of the resin to be used, and the position of the screw in the cylinder for determining the resin amount for injection is set by a detecting means such as a limit switch, which is disposed in the drive mechanism, as well as means for rotating the screw and means for applying the back pressure to the screw.

With the construction of the injection molding machine of conventional type described above, the position of the screw is detected by the limit switch and accordingly controlled indirectly by the relative relationships between the revolution number of the screw and the back pressure thereof. This involves such a problem that the screw may stop at a position beyond the desired stop position for the reason that the rotation of the screw is stopped after the operation of the limit switch. In order to obviate this defect in the prior technique there is no countermeasure other than to gradually slow down the rotation of the screw as the screw approaches the limit switch, or to set the operating point of the limit switch before the theoretical operating point by taking into consideration the excessive backward movement of the screw. For the reason described above, it is necessary in actual to determine the screw position during the resin measuring stroke by repeating the trials and errors. Furthermore, it is difficult to precisely set the operating point of the limit switch based on external factors such as kinds of resins to be used, shapes of molds, temperature variation, moisture of the resin and the variation of the resin amount fed from the hopper into the heating cylinder, thus being difficult to obtain the accurate resin amount for injection as well as to set an accurate operating point of the limit switch. It is, therefore, impossible to evenly inject the resin into the mold and to prevent the degradation of the quality of the molded products. Moreover, in this conventional technique, it is obliged to unnecessarily reduce the revolution numbers of the screw even in the normal operation to stop the screw at the accurate position, thus measurement of the resin amount in a short time, high energy efficiency as well as the improvement of the rate of production being required.

In addition to these problems, when it is required to bring the nozzle portion into contact with the mold opening in a prior art technique, the nozzle portion, i.e. the heating cylinder, is moved towards the mold under a speed control which is then switched to a pressure control when the nozzle portion nearly approaches to the mold. However, it is considerably difficult to know at which position and at what time the speed control is to be switched to the pressure control, and moreover, on this switching time, the injection speed or pressure is adversely changed discontinuously. In the prior art technique, there are found out substantially the same problems in the mold clamping operation and the resin injection operation.

SUMMARY OF THE INVENTION

An object of this invention is to eliminate defects or problems encountered in the prior art technique and to provide a method for controlling an injection molding machine in which a nozzle portion of a heating cylinder of an injection apparatus can contact a mold of a molding apparatus exactly and speedily.

Another object of this invention is to provide a method for controlling an injection molding machine in which a speed control and a pressure control can be smoothly switched during a nozzle pressing and contacting process, a mold clamping process, an injection process and like injection molding operations.

According to this invention, in general aspect, there is provided a method for controlling an injection molding machine comprising an injection apparatus and a molding apparatus in which molten resin is injected into a mold cavity of a mold (i.e., mold halves) of the molding apparatus from a nozzle portion provided at the front end of a heating cylinder of the injection apparatus, the controlling method being characterized, in nozzle pressing and contacting process, a mold clamping process, an injection process and the like, by the steps of moving a movable side towards a stationary side of the injection molding machine under a speed control condition thereof with respect to the stationary side of the injection molding machine, measuring a pressure of the movable side acting on the stationary side, comparing the measured pressure with a predetermined set pressure, and switching the speed control to a pressure control when a fact that the measured pressure reaches to a predetermined set pressure is detected.

Moreover, in one specific aspect of this invention, there is provided a method for controlling the injection molding machine in a nozzle pressing or contacting process characterized by the steps of moving a nozzle portion towards the mold under a speed control condition, measuring a pressure of the nozzle portion with respect to the mold, switching the speed control to a pressure control when the fact that the measured pressure reaches a predetermined set pressure is detected, and bringing the nozzle portion into contact with the mold under a pressure of the predetermined set pressure.

BRIEF DESCRIPTION OF THE DRAWINGS

In the accompanying drawings:

FIG. 17 shows a block diagram of a speed control system for the injection molding machine;

FIGS. 18A and 18B are graphs showing discontinuous characteristics at a time when the speed control is switched to the pressure control;

FIGS. 19A to 19B and 20A to 20B are graphs showing continuous characteristics attained by the method of this invention at a time when the speed control is switched to the pressure control; and FIG. 21 shows one example of the control circuit according to this invention.

DESCRIPTION OF THE PREFERRED EMBODIMENTS

Figure 1:
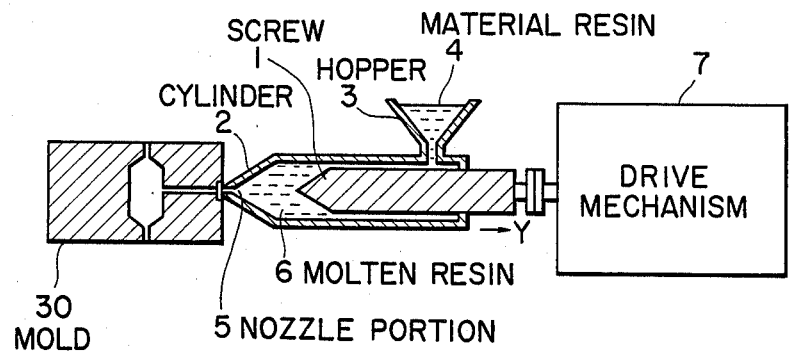
FIG. 1 is a schematic longitudinal sectional view of an injection molding machine of general type.

As conducive to a full understanding of the exact nature of this invention, general aspect of an injection molding machine of a conventional type and various problems encountered in the known type will first be considered with reference to FIG. 1.

FIG. 1 shows a schematic longitudinal section of an injection molding machine of a general type in which a material resin 4 is fed to a heating cylinder 2 through a hopper 3 and then fed forwardly, i.e. leftwardly as viewed in FIG. 1, by the rotation of a screw 1 disposed in the heating cylinder 2. The resin 4 in the heating cylinder 2 is heated by a heater such as a heating coil (not shown) located on the outer periphery of the heating cylinder 2 and sheared and kneaded thereby to plasticize the resin. The thus obtained molten resin 6 is stored in a space formed at the front end portion of the heating cylinder 2 and then injected into a mold cavity of a mold 30 through a nozzle portion 5 of the heating cylinder 2. In this operation, since the front end of the nozzle 5 is pressed against the opening of the mold 30, the screw 1 is backwardly, i.e. in a direction of Y, moved by the pressure of the molten resin 6 once filled in the mold cavity. A drive mechanism 7 is operatively connected to the srew 1 in order to apply the back pressure to the screw 1 for preventing the molten resin 6 from flowing outwardly and from introducing air from the nozzle portion 5 and the hopper 3 into the cylinder 2 and for precisely measuring the resin amount in a resin measuring process. Thus, the screw 1 is gradually backwardly moved in the Y-direction by the pressure difference between the resin pressure caused by the screw rotation and the back pressure applied by the drive mechanism 7. With the injection molding machine of the type described above, the position of the screw for determining the amount of resin to be injected is set by a detecting means such as a limit switch located in the drive mechanism 7 in consideration of the kind of the resin to be used, the temperature thereof and the like.

However, a system or mechanism in which the limit switch detects and determines the screw position for the measuring stroke involves various problems such as described hereinbefore to accurately detect the screw position in the resin measuring process, and it is therefore required to provide an improved mechanism or apparatus and method for eliminating these problems.

Figure 2:
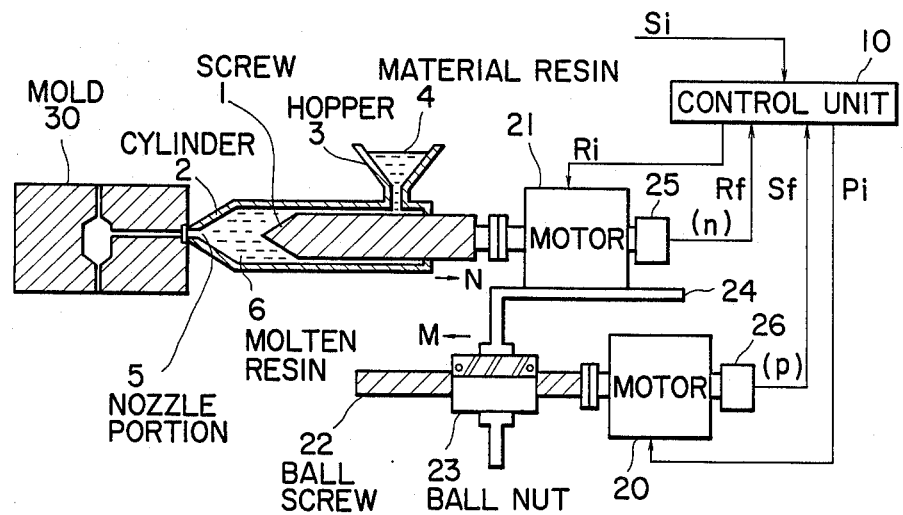
FIG. 2 is a schematic longitudinal sectional view of an injection molding machine according to this invention.

FIG. 2 shows a schematic block diagram of an injection molding machine, in which like reference numerals are assigned to elements corresponding to those shown in FIG. 1. In FIG. 2, an electric motor 21 is operatively connected to the screw 1 disposed in the heating cylinder 2 through a drive shaft. The motor 21 is settled on a drive table 24 which is connected to a ball nut 23 with which a ball screw 22 is engaged. The ball screw 22 is operatively connected to an electric motor 20 through a drive shaft thereof. A control unit 10 is operatively connected to the motors 20 and 21 through sensors 26 and 25, respectively. An instruction signal Si regarding the position of the screw 1 is inputted to the control unit 10 and the instruction signal Si is operated therein. A signal Pi regarding the operated back pressure of the screw 1 is transmitted to the motor 20 for shifting the screw position and a signal Ri regarding the operated revolution number of the screw 1 is also transmitted to the motor 21 for rotating the screw 1.

When the motor 21 is driven in response to the signal Ri, the screw 1 is rotated and the material resin 4 is fed into the heating cylinder 2 from the hopper 3. The resin is then sheared and kneaded by the advancement of the screw thereby to plasticize the resin, and when the heating cylinder 2 is filled with the plasticized or molten resin 6, the screw 1 is backwardly, i.e. in a direction of N, moved by the pressure of the stored molten resin. During this operation a back pressure is applied to the screw so as to precisely measure the resin amount without inducing air into the heating cylinder 2. A torque is generated, as a back pressure in a direction M with respect to a force for retracting the screw 1 and the motor 21 on the table 24 backwardly in the N-direction, by the ball nut 23 engaged with the ball screw 22 which is connected to the motor 20 which is driven in response to the signal Pi transmitted from the control unit 10. The sensor 25 connected to the motor 21 detects the revolution number n of the screw 1 and generates a screw revolution number feedback signal Rf to the control unit 10 and the sensor 26 connected to the motor 20 detects the position of the ball nut 23, i.e. the position of the screw 1, and generates a screw position feedback signal Sf representing the back pressure p to the control unit 10.

Figure 3:
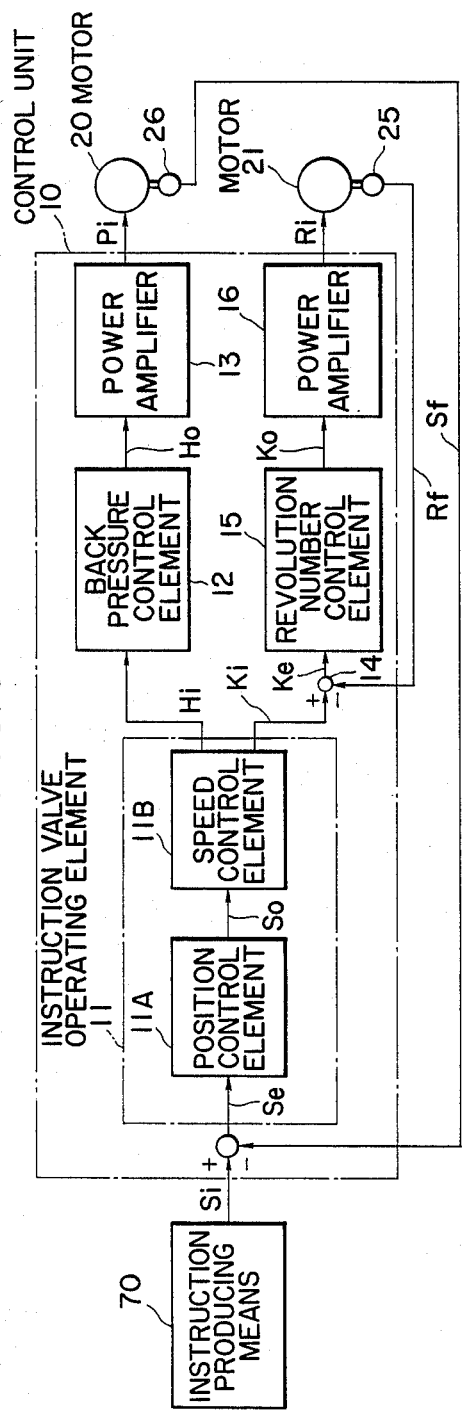
FIG. 3 is a block diagram showing one embodiment of a control system for the injection molding machine according to this invention.

FIG. 3 is a block diagram of the control unit 10 embodying the construction thereof. Referring to FIG. 3, a signal regarding deviation Se between the position instruction signal Si from an instruction producing means 70 and the screw position feedback signal Sf is inputted into a position control element 11A constituting an instruction value operating element 11, and a signal So operated so as to compensate for the characteristics of closed loop control is inputted into a speed control element 11B also constituting the operating element 11. A back pressure instruction signal Hi and a revolution number instruction signal Ki required for controlling the screw 1 are transmitted from the speed control element 11B. The back pressure instruction signal Hi is inputted to a back pressure control element 12 from which a signal Ho operated for compensating for the characteristics of the closed loop control is then inputted to an electric power amplifier 13. The electric power is amplified by the amplifier 13 and a screw back pressure signal Pi is then inputted to the motor 20 for driving the same. While, the revolution number instruction signal Ki is inputted to a subtractor 14, and a signal regarding deviation Ke between the signal Ki and the revolution number feedback signal Rf obtained by the subtractor 14 is then inputted to a revolution number control element 15. An output Ko operated for compensating for the characteristics of the closed loop control is inputted to an electric power amplifier 16 to amplify the electric power and the screw rotation signal Ri is transmitted therefrom into the motor 21.

Figure 4:
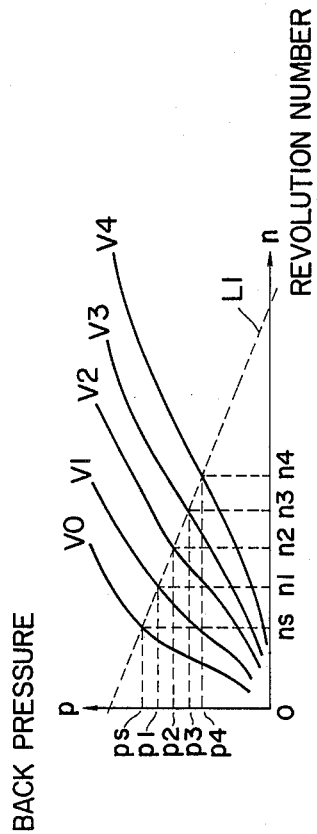
FIG. 4 is a graph showing characteristics between a revolution number and a back pressure of a screw of the injection molding machine in connection with FIG. 3.

FIG. 4 shows a graph for explaining the operation of the injection molding machine having the construction described hereinabove, in which an axis of quadrature designates a revolution number n of the screw 1 and an axis of abscissa designates a back pressure p of the screw 1, and characters V0 through V4 represent moving speeds of the screw 1 (V0: low speed; V4: high speed).

A series of operations of the resin measuring process with respect to the mold or molding machine 30 are explained hereunder with reference to FIG. 2.

Since the amount of the molten resin 6 to be measured is determined in accordance with the position at which the screw 1 stops, the position instruction Si inputted to the control unit 10 represents the amount of the resin 6. The measuring stroke is completed when the screw 1 moves till the position sensor 26 generates the screw position feedback signal Sf corresponding to the position instruction Si. The process for completing the measuring stroke will be described in conjunction with FIG. 3. When the deviation Se is inputted to the position control element 11A, the deviation Se is controlled so as to compensate for the closed loop characteristics with the predetermined frequency characteristics thereby to generate the signal So which is then inputted to the speed control element 11B. The speed control element 11B generates, in combination, the back pressure instruction Hi and the revolution number instruction Ki for controlling the screw to reduce the speed thereof to zero and to complete the measuring stroke. This will also be explained in connection with the graph of FIG. 4. At the start of the resin measuring stroke, the instruction Hi and Ki instruct the back pressure P4 and the revolution number n4 to obtain possibly high revolution number of the screw 1 to improve the measuring efficiency. In other words, the speed V4 of the screw 1 is determined by the relative difference between the movement thereof in the direction N and the back pressure in the direction M shown in FIG. 2, the speed V4 being relatively high speed. A broken line L1 in FIG. 4 shows a combined relationship between the revolution number n and the back pressure p which are variable in progress of the measuring process, and the inclination of this line L1 can be freely selected and set. The resin measuring process is started with the combination of the revolution number n4 and the back pressure p4 of the screw 1, which thereafter change as n3, p3; n2, p2; n1, p1, and finally ns, ps at which time the speed of the screw 1 becomes V0, and thereafter the screw 1 stops thereby to complete the resin measuring process. Namely, the revolution number ns and the back pressure ps become substantially zero when the screw speed approaches V0, and at the completion of the measuring stroke the screw 1 smoothly stops at the predetermined correct position in accordance with the position instruction Si without passing beyond the correct position. Thus, the correct amount of resin to be measured can be obtained and the back pressure p at this time can be selected to a desired value ps for the preparation of the next measuring stroke. In addition, by setting the revolution number n during the measuring process to a relatively high value, the frictional heat between the resin and the screw is increased, thus reducing the energy required for heating the cylinder 2.

Figure 5:
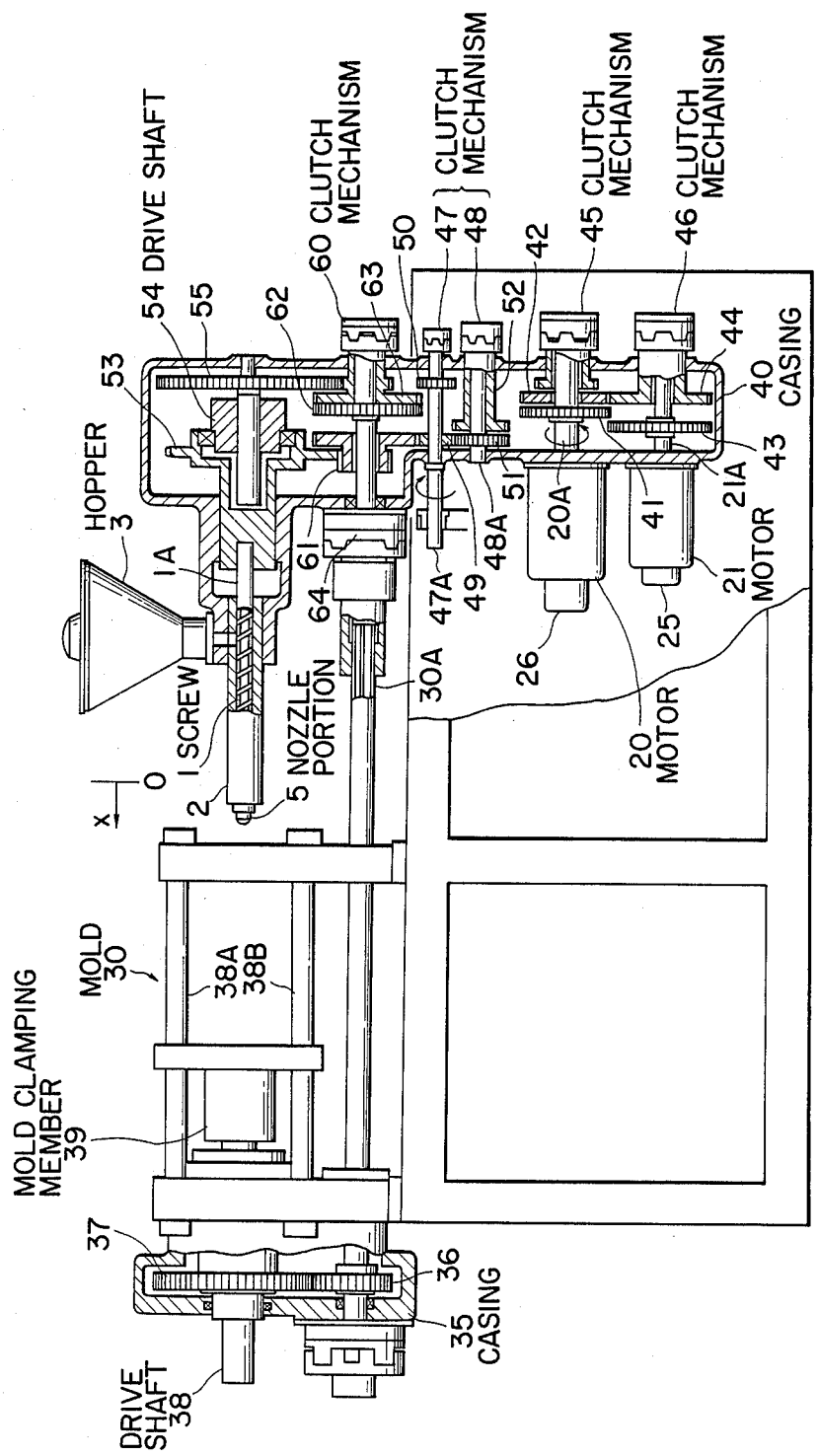
FIG. 5 shows an injection molding machine, partially in longitudinal section, used for carrying out the method according to this invention.

FIG. 5 shows a detailed construction of an injection molding machine controlled on the basis of the control principle described hereinabove.

Referring to FIG. 5, electric motors 20 and 21 are attached to a casing 40 secured to an injection molding machine. Gears 41 and 42 are mounted on a rotation shaft 20A of the motor 20 and gears 43 and 44 are mounted on a rotation shaft 21A of the motor 21, respectively. These gears 41 through 44 act to transfer driving forces by clutch mechanisms 45 and 46 attached to the respective end portions of the rotation shafts 20A and 21A. To the casing 40 are rotatably supported transmission shafts 47A and 48A which act to transfer the driving forces by clutch mechanisms 47 and 48, and gears 49 and 50 and gears 51 and 52 are mounted on the transmission shafts 47A and 48A, respectively. The gears 49 and 50 are engaged with or disengaged from gears 61, 62 and 63 mounted on a drive shaft 30A by a clutch mechanism 60 attached to the end portion of the shaft 30A, which is rotatably supported by the casing 40 at one end portion thereby to transmit the driving force to a molding machine, i.e. mold 30 in FIG. 5, to move a mold clamping member 39. The other end portion of the drive shaft 30A is rotatably supported by a casing 35 of the mold 30. On the drive shaft 30A located in the casing 35 is mounted a gear 36 with which a gear 37 is engaged to transmit the driving force to a drive shaft 38 to move or slide the mold clamping member 39 on shafts 38A and 38B. A drive shaft 1A is located in the casing 40 and connected at one end thereof to a screw 1 disposed in a heating cylinder 2 of the injection molding machine, and a gear 53 is mounted on the shaft 1A. A gear 53 is further mounted on a drive shaft 54 which is connected through a bearing to an inside portion of the gear 53. According to the construction described above, the injection molding machine carries out various operations such as for clamping mold halves by moving forwardly the mold clamping member 39, increasing the clamping pressure, injecting and filling the molten resin into the mold 30, measuring and cooling the resin to plasticize the resin, moving backwardly the nozzle portion 5 of the heating cylinder 2, decreasing the mold clamping pressure, moving backwardly the mold clamping member to open the mold halves, and pushing out a molded product from the mold cavity. A series of these resin injection and molding operations are repeated to obtain molded products continuously.

Referring to FIG. 5 which shows a condition of an injection molding machine just before the injection molding operation, when it is required to clamp the mold halves and increase the pressure, the motor 20 is first driven to transmit the rotating force of the motor 20 to the drive shaft 30A through the rotation shaft 20A, the gear 41, the gear 51, the shaft 48A, the gear 52, the gear 50 and the gear 62 in this order. The rotation of the drive shaft 30A is transmitted to the drive shaft 38 through the gears 36 and 37 to rotate the same and thereby to move the mold clamping member 39 forwardly, i.e. rightwardly as viewed in FIG. 5. When the mold clamping member 39 stops at a predetermined stop position and the clamping pressure reaches a predetermined point, the clutch mechanism 64 is switched so as to cut off the power transmission through the gear 62 to the gear 36 and the clutch mechanisms 45 and 47 are switched to rotate only the shaft 47A thereby to move the casing 40 forwardly, i.e. leftwardly in FIG. 5, so that the nozzle portion 5 of the heating cylinder 2 approaches or is contacted to the opening of the mold 30. The nozzle portion 5, i.e. the casing 40, is retracted by reversely driving the motor 20.

When it is required to inject the molten resin into the mold, the motors 20 and 21 are driven to transmit the rotations of the gears 41 and 42 to the gears 62 and 63 through gears (not shown) by switching the clutch mechanisms 45 and 46, respectively, thereby to transmit the rotations of the gears 62 and 63 to the gear 55 by switching the clutch mechanism 60. The rotations of the motors 20 and 21 are transmitted to the drive shafts 54 and 1A through the gear 55 thereby to forwardly move the screw 1, thus injecting the molten resin in the heating cylinder 2 into the mold 30 through the nozzle portion 5. When it is required to carry out the measuring of the resin, only the motor 21 is driven so that the rotation of the motor 21 is transmitted to the screw 1 through the gear 43, a gear (not shown), the gear 52, the shaft 48A, the gear 51, the gear 49, the gear 61 and the gear 53. In synchronism with this operation of the motor 21, the motor 20 is also driven so that the rotation of the motor 20 is also transmitted to the screw 1 through the gear 42, a gear (not shown), the gear 62, the clutch mechanism 60, the gear 55, the shaft 54 and the shaft 1A to apply the back pressure to the screw 1 and to measure the resin amount.

The mold halves of the molding apparatus 30 are opened by retracting the mold clamping member 39 by driving the motor 20 reversely to the manner described with reference to the mold clamping operation.

The detail of the construction and the operation of the control unit 10 in FIG. 3 will be described hereunder in conjunction with FIGS. 6 through 16.

Figure 6:
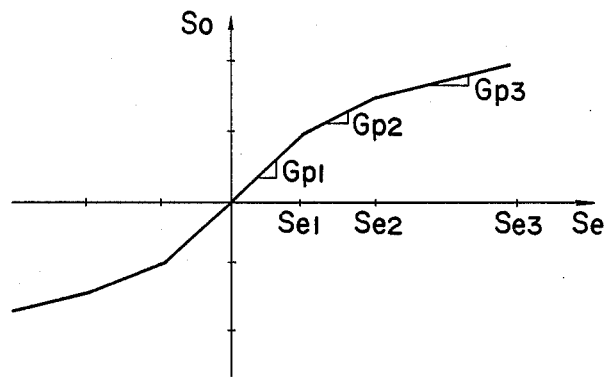
FIG. 6 is a graph showing one example of a function which is generated by a position control element in FIG. 3.
Figure 7:
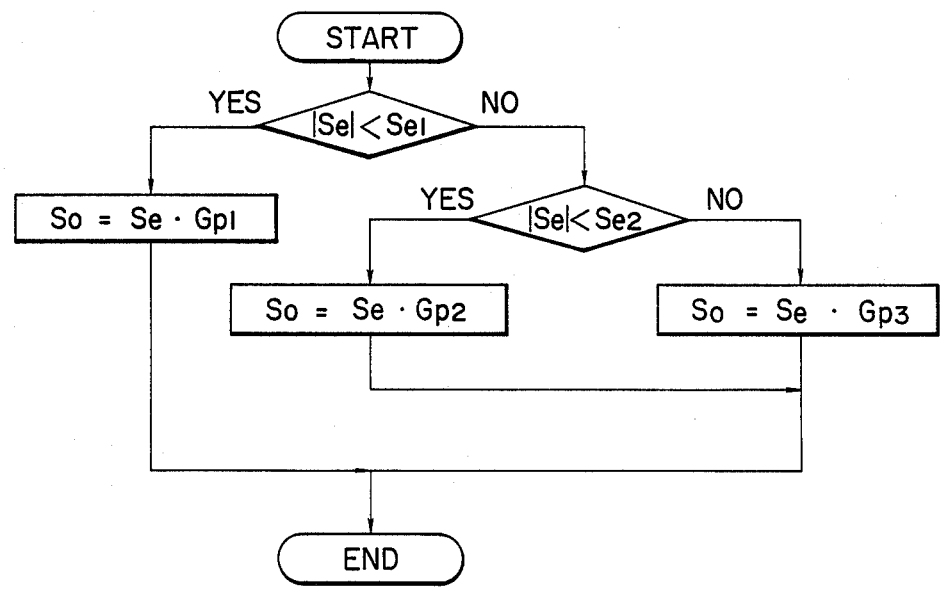
FIG. 7 is a flow chart showing operation of the position control element.
Figure 8:
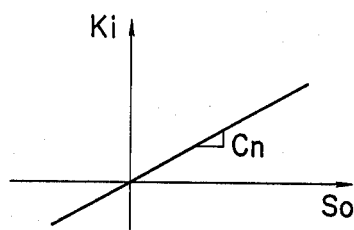
FIGS. 8, 9 and 11 are graphs showing one example of functions which are generated by a speed control element in FIG. 3.
Figure 9:
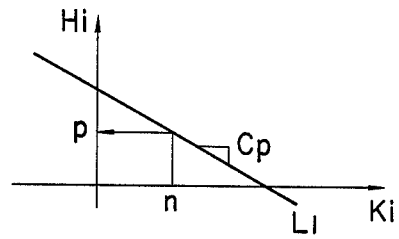
Figure 10:
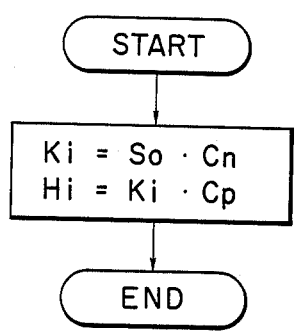
FIGS. 10 and 12 are flow charts showing operation of the speed control element.
Figure 11:
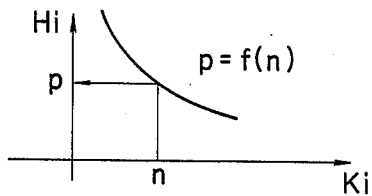
Figure 12:
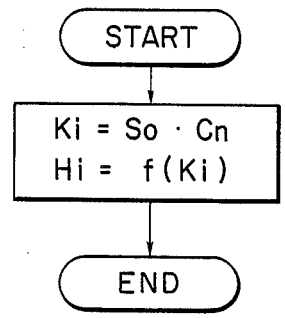
Figure 13:
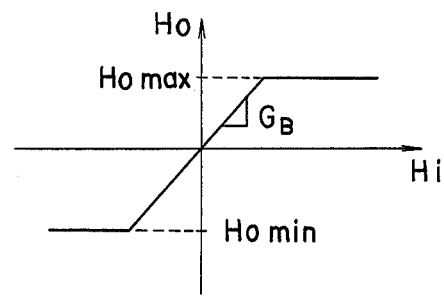
FIG. 13 is a graph showing one example of a function which is generated by a back pressure control element in FIG. 3.
Figure 14:
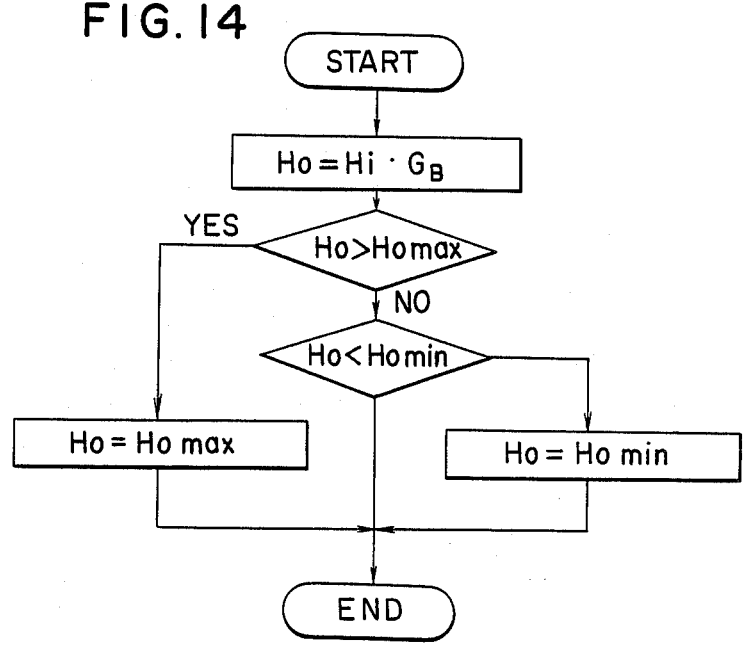
FIG. 14 is a flow chart showing operation of the back pressure control element.
Figure 15:
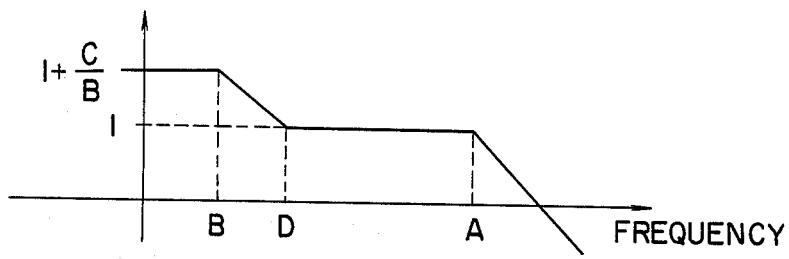
FIG. 15 is a graph showing one example of a function which is generated by a revolution number control element in FIG. 3.
Figure 16:
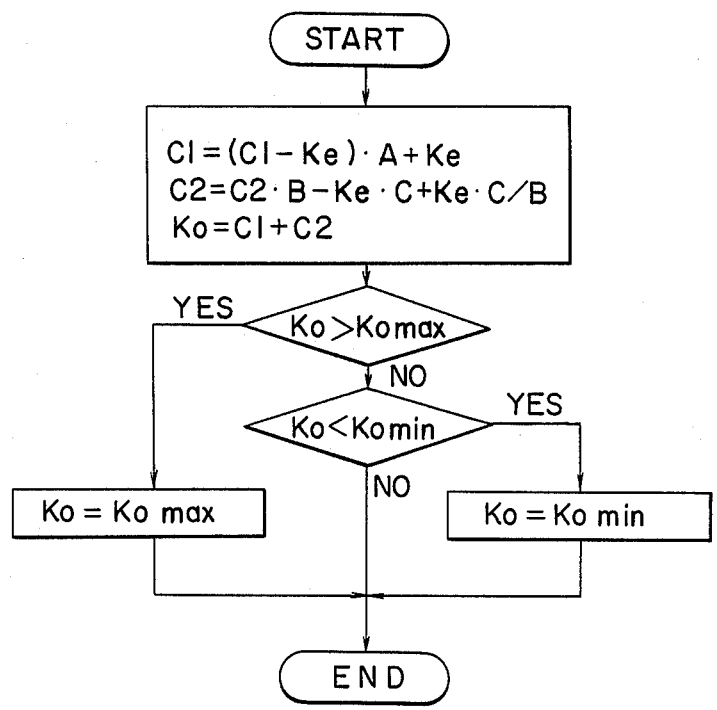
FIG. 16 is a flow chart showing operation of the revolution number control element.

A signal So generated by the position control element 11A is shown in FIG. 6. In FIG. 6 $G_{P1}$, $G_{P2}$ and $G_{P3}$ denote position control loop gains and the position control element 11A operates in accordance with a flow chart of FIG. 7. The signal So is inputted to the speed control element 11B and then converted to the revolution number instruction signal Ki as shown in FIG. 8 and the back pressure instruction signal Hi having a relationship as shown in FIG. 9. In this case, the speed control element 11B operates in accordance with a flow chart of FIG. 10. FIG. 11 shows another relation between the revolution number instruction signl Ki and the back pressure instruction signal Hi, and the speed control element 11B operates as shown in FIG. 12. FIG. 13 is a graph showing one example of the signal Ho as a function which is generated by the back pressure control element 12 and the operation thereof is shown in a flow chart of FIG. 14. In FIGS. 13 and 14, $G_B$ denotes back pressure control gain, and Homax and Homin represent back pressure maximum and minimum, respectively. Further, a response of the revolution number control element 15 is shown in FIG. 15 and the operation thereof is shown in a flow chart of FIG. 16. In FIGS. 15 and 16, A, B, C, and D are parameters, respectively and parameter D is given as $D = \{A(B+C)\}/(A+C)$, C1 and C2 are variables and Komax and Komin are command signals corresponding to maximum and minimum revolution numbers.

With these operations it is necessary to forwardly move the nozzle portion 5 after the mold clamping operation in response to the speed control by the driving of the motor 20 and to press the nozzle portion 5 to the mold opening under a predetermined pressure after the nozzle portion contacts the mold opening. Accordingly, in this operation, it is a problem how to switch the driving method of the motor 20 to the pressure control system from the speed control system with respect to the speed instruction $v_i$ shown in FIG. 17. In the speed control system in FIG. 17, a speed deviation $v_e$ is converted to a torque instruction Ti in a loop system 80 (GS), and in response to this torque instruction Ti, the motor 20 is controlled through an electric power amplifier 81. When the motor 20 is controlled in accordance with this motor control system by the instructed speed $v_1$ from the time instant $t_0$ to the time instant $t_1$ and by the instructed pressure $p_2$ after the time instant $t_1$ as shown in FIGS. 18A and 18B, respectively, it is observed that the speed v and the pressure p both become discontinuous at the time instant $t_1$ at which the control mode is switched, so that various operations such as injection operation cannot be smoothly carried out.

In order to eliminate these problems or disadvantages encountered in the prior art technique, according to this invention, the nozzle portion 5 is forwardly moved by the speed control and the collision of the nozzle portion 5 with the mold 30 is detected by the facts that a nozzle moving distance x becomes constant and the nozzle speed v becomes zero when the nozzle portion 5 collides with the mold 30. The speed control is switched to the pressure control when an actual pressure p reaches the instructed pressure $p_i$ after the detection of the collision of the nozzle portion 5 with the mold 30.

FIGS. 19A and 19B are graphs showing relations among the moving distance x and speed v and times, respectively, for explaining the collided condition of the nozzle portion 5 with the mold 30. Referring to FIGS. 19A and 19B, the nozzle 5 is moved at the constant instructed speed $v_i$ up to the time instant $t_2$ and the moving distance x of the nozzle portion 5 increases linearly. When the nozzle portion 5 collides with the opening of the mold 30, the moving speed v becomes zero and the moved distance x does not further increase and is maintained as a constant distance $x_0$ after the time instant $t_2$. Accordingly, the time instant $t_2$ at which the nozzle portion 5 collides with the mold 30 can be detected by detecting the variation of the moving distance x and the fact that the speed v becomes zero.

After the collision of the nozzle portion 5 with the mold 30, the injection pressure p gradually increases by gradually reducing the moving speed v and when the pressure p reaches the predetermined pressure $p_i$ as shown in FIGS. 20A and 20B (i.e. at the time instant $t_3$), the speed control mode is switched to the pressure control mode. According to the manner described above, the movement of the nozzle portion can be controlled by the speed control with a constant value up to the time instant $t_2$ due to the speed instruction $v_i$, and it is waited that the pressure p reaches the instructed pressure $p_i$ during a short transient time interval up to the time instant $t_3$ from the time instant $t_2$ at which the nozzle 5 collides with the mold 30. When the pressure reaches the instructed pressure $p_i$ (time instant $t_3$), the speed control can be smoothly switched to the pressure control. It will be of course understood that the nozzle portion 5 collides with the mold 30 at a speed suitable for giving no damage to the mold 30.

FIG. 21 shows a block diagram of an apparatus for embodying the method of this invention. Referring to FIG. 21, the collision of the nozzle portion 5 with the mold 30 is detected by a collision detecting circuit 70 which generates a collision signal CL in response to the detection of a drive current of the motor 20 and pulse numbers from the position sensor 26. The collision signal CL is inputted to a torque detecting circuit 71 in which a torque T from a loop system 80 is compared with the instructed pressure $p_i$ from a setting circuit 72 and a switching signal SW is produced from the torque detecting circuit 71 on the basis of the compared result. Between the loop system 80 and an electric power amplifier 81 is provided a switching circuit 73 which switches the torque T (contact a) to the pressure $p_i$ (contact b) in response to the switching signal SW.

According to the construction described above, the collision detecting circuit 70 always detects the collision of the nozzle portion 5 with the mold 30 and the collision signal CL is inputted, when the fact of the collision is detected, to the torque detecting circuit 71 in which the actual torque T (pressure p) is compared with the instructed pressure $p_i$ set in the setting circuit 72. In this comparison, when the instructed pressure $p_i$ is lower than the pressure p before the collision, the instructed speed $v_i$ is made zero when the collision is detected, and when the torque T becomes equal to the set pressure $p_i$, the switching signal SW is outputted to switch the contact a to the contact b of the switching circuit 71 thereby to carry out the pressure control of the instructed pressure $p_i$.

Although in the foregoing descriptions is stated the controlling method of the nozzle pressing and contacting process under pressure, it will be also noted that the speed control can be smoothly switched to the pressure control in the mold clamping operation, the injection operation and the like by substantially the same manner as described hereinabove in relation to the nozzle contacting operation. Namely, this invention will be summerized as follows. In a method for controlling an injection molding machine provided with a movable side and a stationary side, the movable side is moved by a controlled speed, and the pressure thereof with respect to the stationary side is then measured. When the measured pressure becomes equal to a predetermined set pressure, the speed control is switched to the pressure control.

In an actual injection molding operation, as described hereinbefore, in the nozzle contact process, the nozzle portion constitutes a movable side and the mold constitutes a stationary side of the injection molding machine. In the mold clamping process, the movable side is movable mold half and the stationary side is a stationary mold half, and in the injection operation or resin measuring process, the screw constitutes the movable side and the mold, i.e. molding apparatus, constitutes the stationary side. In these processes, the measurement of the pressure is done by detecting the collision of the movable side with the stationary side.

In the foregoing descriptions, the revolution number n of the screw 1 is detected by the sensor 25 connected to the motor 21, but the revolution number n may be detected through gears or by the detection of the motor current. Moreover, the position of the screw may be detected by positions of the drive table 24 and the ball nut 23, and the screw is moved in combination with the ball screw and the ball nut or by being moved on a guide member by driving a motor. A d.c. or a.c. motor can be alternatively used.

As described above, according to the control method of this invention, the speed control of the nozzle portion of an injection molding machine an be switched smoothly to the pressure control by merely detecting the fact of the collision of the nozzle portion with the mold or by any other means, so that the control of the injection molding machine can be easily achieved with low cost. In addition, since the switching operation from the speed control to the pressure control can be performed at the time when such fact is detected that the actual pressure reaches the set pressure, without detecting the nozzle portions, the switching operation can be smoothly carried out with a relatively simple construction of control means.

What is claimed is:

1. A method for controlling an injection molding machine comprising an injection means and a mold in which molten resin is injected into a mold cavity defined by movable and stationary mold halves of the mold from a nozzle portion of a heating cylinder of the injection means, comprising the steps of:

moving said movable mold half towards said stationary mold half of the mold under speed control of said movable mold half with respect to the stationary mold half;

measuring a pressure between said movable mold half and said stationary mold half;

comparing the measured pressure with a predetermined set pressure; and switching said speed control of said movable mold half to a pressure control of said movable mold half at a time when it is detected that the measured pressure is equal to the predetermined set pressure by said comparison.

2. The method according to claim 1 wherein the time for switching said speed control to said pressure control is changeable by setting the predetermined set pressure to a desired value.

3. The method according to claim 1 wherein a measurement of said pressure of the force of said movable mold half acting on said stationary mold half is performed by detecting that said movable mold half has collided with said stationary mold half.

4. The method according to claim 3 wherein a measurement of said pressure acting on said mold is performed by detecting that said nozzle portion has collided with said mold.

5. A method for controlling an injection molding machine comprising an injection means and a mold in which molten resin is injected into a mold cavity defined by mold halves of mold from a nozzle portion of a heating cylinder of the injection means, comprising the steps of:

moving said nozzle portion of said injection means towards said mold under a condition of speed control of said nozzle portion;

measuring a pressure between said nozzle portion and said mold;

comparing the measured pressure with a predetermined set pressure;

switching said speed control of said nozzle portion to a pressure control of said nozzle portion at a time when the measured pressure reaches the predetermined set pressure; and completing contacting of said nozzle portion with said mold under said predetermined set pressure.

6. A method for controlling an injection molding machine compising an injection means and a mold in which molten resin is injected into a mold cavity defined by old halves of the mold from a nozzle portion of a heating cylinder of the injection means, comprising the steps of:

moving said nozzle portion of said injection means towards said mold under a condition of speed control of said nozzle portion;

detecting collision of said nozzle portion with said mold with a collision detecting means;

generating a collision signal from the collision detecting means in response to said collision;

obtaining a torque of said injection molding machine in a direction of forward movement of said nozzle portion;

comparing the obtained torque with a predetermined set value when said collision signal is generated; and generating a switching signal for switching said speed control to said pressure control if the obtained torque is equal to the predetermined set value;

switching said speed control of said nozzle portion to a pressure control of said nozzle portion at a time when the measured pressure reaches the predetermined set pressure; and completing contacting of said nozzle portion with said mold under said predetermined set pressure.

7. The method according to claim 6 wherein said torque and said predetermined set value are switched in response to said switching signal and the switched result is applied to a drive source of said injection molding machine.

* * * * *